United States Patent
Karaoguz et al.

(10) Patent No.: US 8,189,511 B2
(45) Date of Patent: May 29, 2012

(54) MEDIA EXCHANGE NETWORK SUPPORTING REMOTE PERIPHERAL ACCESS

(75) Inventors: Jeyhan Karaoguz, Irvine, CA (US); James D. Bennett, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 209 days.

(21) Appl. No.: 12/417,428

(22) Filed: Apr. 2, 2009

(65) Prior Publication Data

US 2009/0191865 A1   Jul. 30, 2009

Related U.S. Application Data

(60) Division of application No. 11/462,922, filed on Aug. 7, 2006, which is a continuation of application No. 10/675,413, filed on Sep. 30, 2003, now Pat. No. 7,170,882.

(60) Provisional application No. 60/478,270, filed on Jun. 13, 2003, provisional application No. 60/478,286, filed on Jun. 13, 2003, provisional application No. 60/448,705, filed on Feb. 18, 2003, provisional application No. 60/469,182, filed on May 9, 2003, provisional application No. 60/444,243, filed on Jan. 30, 2003, provisional application No. 60/464,697, filed on Apr. 23, 2003, provisional application No. 60/432,472, filed on Dec. 11, 2002, provisional application No. 60/443,894, filed on Jan. 30, 2003.

(51) Int. Cl.
*H04W 4/00* (2009.01)

(52) U.S. Cl. ............... 370/328; 455/432.1; 709/217

(58) Field of Classification Search ............ 370/328, 370/329, 331, 338; 455/461, 456.1, 414.2, 455/432.1, 432.3, 433; 709/217, 218, 219
See application file for complete search history.

(56) References Cited

U.S. PATENT DOCUMENTS

| | | | |
|---|---|---|---|
| 5,742,668 A * | 4/1998 | Pepe et al. ................. | 455/415 |
| 5,742,905 A * | 4/1998 | Pepe et al. ................. | 455/461 |
| 6,301,350 B1 | 10/2001 | Henningson et al. | |
| 6,463,131 B1 | 10/2002 | French-St. George et al. | |
| 6,463,270 B1 * | 10/2002 | Chang et al. ............... | 455/403 |
| 6,546,246 B1 | 4/2003 | Bridges et al. | |
| 6,615,041 B2 | 9/2003 | Adamany et al. | |
| 6,774,926 B1 | 8/2004 | Ellis et al. | |
| 7,917,602 B2 * | 3/2011 | Sweatt et al. ............... | 709/220 |
| 2002/0016971 A1 | 2/2002 | Berezowski et al. | |
| 2002/0055351 A1 * | 5/2002 | Elsey et al. ................ | 455/414 |
| 2002/0077084 A1 | 6/2002 | Zellner et al. | |
| 2002/0085701 A1 * | 7/2002 | Parsons et al. ............ | 379/211.01 |
| 2002/0120697 A1 * | 8/2002 | Generous et al. .......... | 709/206 |
| 2004/0003051 A1 | 1/2004 | Krzyzanowski et al. | |
| 2004/0132403 A1 | 7/2004 | Alba | |
| 2004/0198386 A1 * | 10/2004 | Dupray ..................... | 455/456.1 |
| 2004/0203593 A1 | 10/2004 | Whelan et al. | |
| 2005/0028208 A1 | 2/2005 | Ellis et al. | |

* cited by examiner

*Primary Examiner* — Brian D Nguyen

(74) *Attorney, Agent, or Firm* — Garlick & Markison; Jessica W. Smith

(57) ABSTRACT

Systems and methods that provide remote access are described. In one embodiment, a system may include, for example, a plurality of communication devices and a media device. The plurality of communication devices may be operatively coupled to a network and may include, for example, a native communication device. The media device may be operatively coupled to the native communication device and the network. The media device may be associated with the native communication device and the network and may be capable of exchanging media content with the plurality of communication devices and the network. A profile of the media device may be stored in at least one of the media device and the native communication device. The profile may include, for example, information related to managing the media content when the media device is roaming.

20 Claims, 14 Drawing Sheets

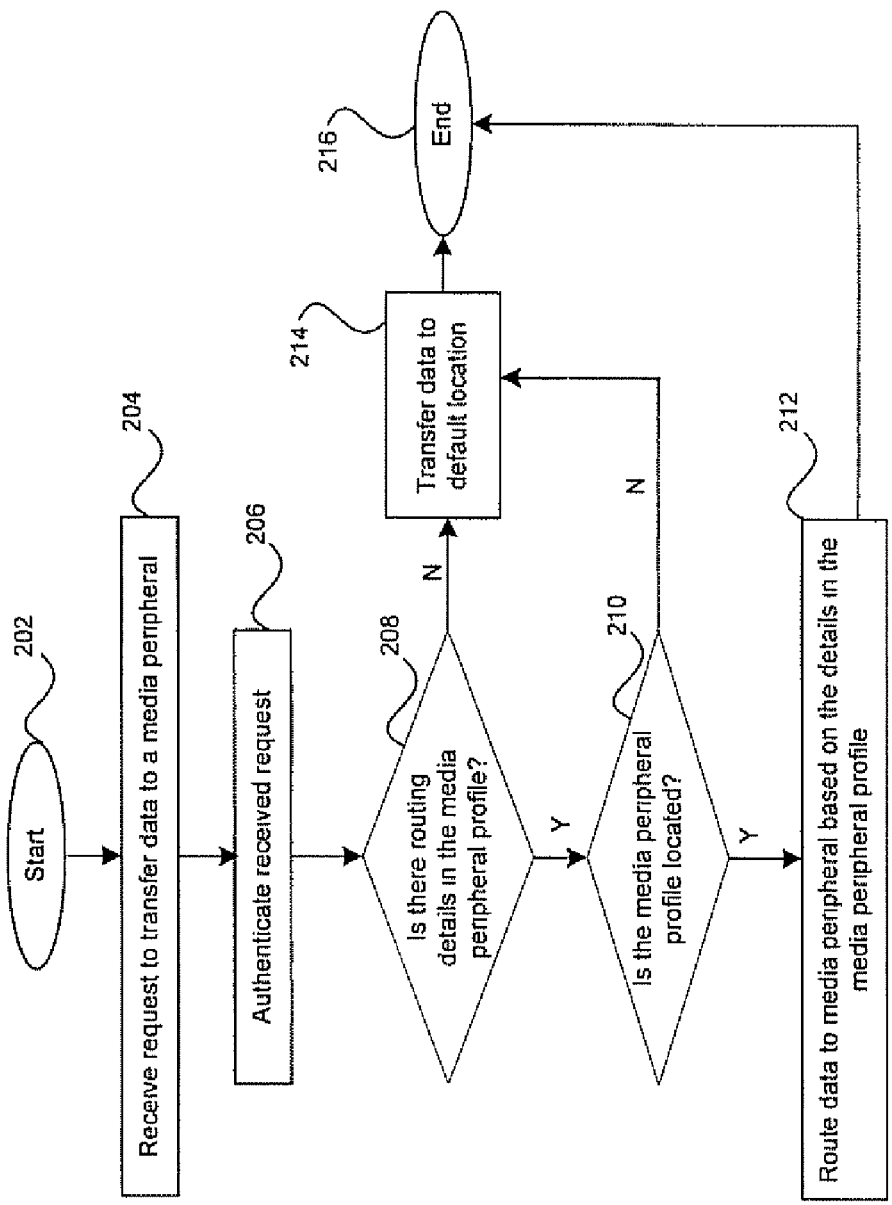

| CHANNEL LINE UP | <<1PM | 2PM | ... HOUR, DAY | 6PM | 7PM>> |
|---|---|---|---|---|---|
| FAMILY VACATIONS | | | | | |
| KID's SPORTS | | | | | |
| VACATION in ALASKA VIDEO  802 | | Normal Estimated Delivery Time: 2 hrs 13 min Cost: 59c (without Queuing) | | Showing All Day (48 Min), Earliest Order Time: 4:00PM MPEG-2 1.5 Mbps | |
| VACATION in ALASKA VIDEO  803 | | Express Estimated Delivery Time: 18 min Cost: $1.2 (with Queuing) | | Showing All Day (48 Min), Earliest Order Time: 4:00PM MPEG-2 4 Mbps | |
| VACATION in ALASKA VIDEO  804 | | Overnight Delivery: Avail Nxt Morning Cost: 5c (Server Stored) | | Showing All Day (48 Min), Earliest Order Time: 4:00PM MPEG-2 19 Mbps | |

MEDIA EXCHANGE NETWORK SUPPORTING REMOTE PERIPHERAL ACCESS

CROSS-REFERENCE TO RELATED APPLICATIONS/INCORPORATION BY REFERENCE

The present application is a divisional of U.S application Ser. No. 11/462,922, filed Aug. 7, 2006, which is a continuation of U.S. application Ser. No. 10/675,413 (now U.S. Pat. No. 7,170,882), filed Sep. 30, 2003, which makes reference to, claims priority to and claims benefit from U.S. Patent Application Ser. No. 60/478,270, entitled "Media Exchange Network Supporting Remote Peripheral Access" and filed on Jun. 13, 2003; U.S. Patent Application Ser. No. 60/478,286, entitled "Media Processing System Communicating Activity Information to Support User and User Base Profiling and Consumption Feedback" and filed on Jun. 13, 2003; U.S. Patent Application Ser. No. 60/448,705, entitled "Media Exchange Network with Media Guide Interface" and filed on Feb. 18, 2003; U.S. Patent Application Ser. No. 60/469,182, entitled "Method and System for Network Storage in a Media Exchange Network" and filed on May 9, 2003; U.S. Patent Application Ser. No. 60/444,243, entitled "Migration of Stored Media Through a Media Exchange Network" and filed on Jan. 30, 2003; U.S. Patent Application Ser. No. 60/464,697, entitled "Secure Linking with Authentication and Authorization in a Media Exchange Network" and filed on Apr. 23, 2003; U.S. Patent Application Ser. No. 60/432,472, entitled "Personal Inter-Home Media Exchange Network" and filed on Dec. 11, 2002; and U.S. Patent Application Ser. No. 60/443,894, entitled "Access and Control of Media Peripherals via a Media Processing System" and filed on Jan. 30, 2003. The complete subject matter of the above-identified applications are hereby incorporated herein by reference in their entirety.

In addition, this application makes reference to U.S. Patent Application Ser. No. 60/457,179, entitled "Server Architecture Supporting A Personal Media Exchange Network" and filed Mar. 25, 2003; U.S. patent application Ser. No. 10/657,390, entitled "Personal Inter-Home Media Exchange Network" and filed on Sep. 8, 2003; and U.S. patent application Ser. No. 10/660,267, entitled "Personal Access and Control of Media Peripherals on a Media Exchange Network" and filed on Sep. 11, 2003. The complete subject matter of the above-identified applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

FIELD OF THE INVENTION

Certain embodiments of the present invention relate to communication of information in a media exchange network, In particular, certain embodiments of the present invention provide a method and a system for a media exchange network supporting remote peripheral access.

BACKGROUND OF THE INVENTION

There are various types of communication services in existence today using various types of physical communication infrastructures, For example, a cable provider uses coaxial cable feeding servers at a cable headend and a digital subscriber line xDSL provider utilizes twisted pair copper phone lines and modems in conjunction with a central office having servers. A satellite provider uses satellites in orbit and antenna dishes and receivers on the ground to wirelessly provide programming to users. Also, an Internet service provider (ISP) may utilize existing telephone lines connected to a server via a modem. Finally, optical fibers may be used to link servers and computers on a research campus or Intranet, for example.

Notwithstanding, different physical layer protocols, supporting different bandwidths and data rates, may be utilized on the different physical communication infrastructures, For example, certain existing telephone lines and servers may support 56K/sec communications using a PC with a 56K modem, Optical fiber lines and/or category five (CAT-5) unshielded twisted pair (UTP) lines may support Gigabit Ethernet (GbE) communications The proliferation of network access peripherals or devices targeting mobile communication services has created a corresponding demand for these services to be available independent of the location.

For example, as media peripherals such as MP3 players or PDAs move or migrate from a first location to a second location, media available at the first location may not be readily available at the second location or readily transferred in a manner similar to that which occurs at the first location. In this regard, the media may have to be downloaded from a website or retrieved via an email, for example, when the media peripheral moves to the second location Additionally, when the media peripheral is at the second location, current means of transferring media back to the first location may include email and/or saving the media to a storage device. In the latter case, once the media has been saved on a storage device, the storage device may then be manually carried from the second location to the first location.

Accordingly, whenever the media player is located at the second location, a user may have to acquire network access from a network service provider (NSP), log on in order to access the network and then determine the location of the media Once the media has been located, the user may have to utilize additional software application to download the media and save the media to the media peripheral In the case of an upload, then after the user has gained access to the network, the user may then have to utilize additional software to upload the media. All of these may be time consuming and in certain instances, may prove to be very expensive As a result, a user may be deterred from accessing the first location once the media peripheral is relocated to the second location. In the case of users that may not be technically savvy, they may not even attempt to communicate from the second location with the media peripheral.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in, for example, systems and methods that provide remote access In one embodiment, a system may include, for example, a plurality of communication devices and a media device. The plurality of communication devices may be operatively coupled to a network and may include, for example, a native communication device. The media device may be operatively coupled to the native communication device and the network. The media device may be associated with the native communication device and the network and may be capable of exchanging media content with the plurality of communication devices and the network,. A profile of the media device may be stored in at least one of the media device and the native communication device. The profile may include, for example, information related to managing the media content when the media device is roaming.

In another embodiment, a method may include, for example, one or more of the following: operatively coupling, by a media device, to a non-native service location; providing access to the media device, at the non-native service location, to information available at a native service location; and routing information associated with the media device in accordance with a profile of the media device, the profile being stored in at least one of a native service location or the media device.

In yet another embodiment, a method may include, for example, one or more of the following: receiving a request to transfer data to or from a device that is roaming; authenticating the received request; and routing the data based on a device profile of the device.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2 is a flow chart illustrating exemplary steps that may be utilized for transferring data in accordance with an embodiment of the present invention.

FIG. 8 is an exemplary illustration of a media guide user interface showing several options of a pushed media in accordance with an embodiment of the present invention.

DETAILED DESCRIPTION OF THE INVENTION

Certain embodiments of the present invention provide a method and a system for a media exchange network supporting remote peripheral access. The media exchange network supporting remote peripheral access may permit media peripherals to connect and communicate at any location within the media exchange network and/or a wide area network encompassing the media exchange network. In this regard, the media peripherals may operate in a manner similar to the way they operate in their home environment.

Figure 1A:
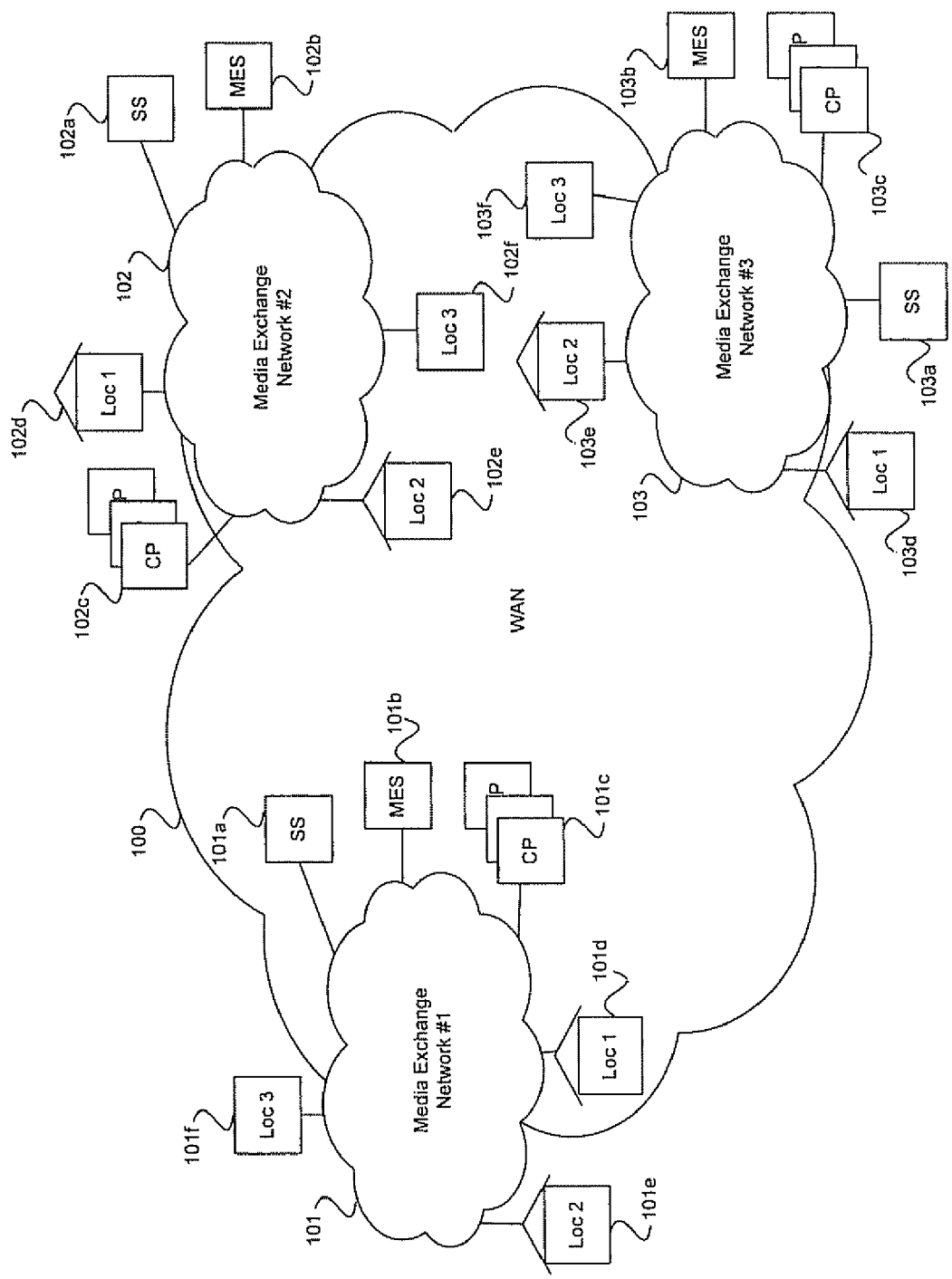
FIG. 1A is a block diagram illustrating a wide area network comprising media exchange networks in accordance with an embodiment of the present invention.

FIG. 1A is a block diagram illustrating a wide area network comprising media exchange networks (MENs) 101, 102 and 103 in accordance with an embodiment of the present invention. The first media exchange network 101 may include a secure server (SS) 101a, a media exchange server (MES) 101b and a plurality of content providers (CPs) collectively illustrated as reference 101c. Additionally, the first media exchange network 101 may include a first location 101d, a second location 101e and a third location 101f. The second media exchange network 102 may include a secure server (SS) 102a, a media exchange server (MES) 102b and a plurality of content providers (CPs) collectively illustrated as reference 102c. Additionally, the second media exchange network 102 may include a first location 102d, a second location 102e and a third location 102f. Finally, the third media exchange network 103 may include a secure server (SS) 103a, a media exchange server (MES) 103b and a plurality of content providers (CPs) collectively illustrated as reference 103c. Additionally, the third media exchange network 103 may include a first location 103d, a second location 103e and a third location 103f.

Figure 1B:
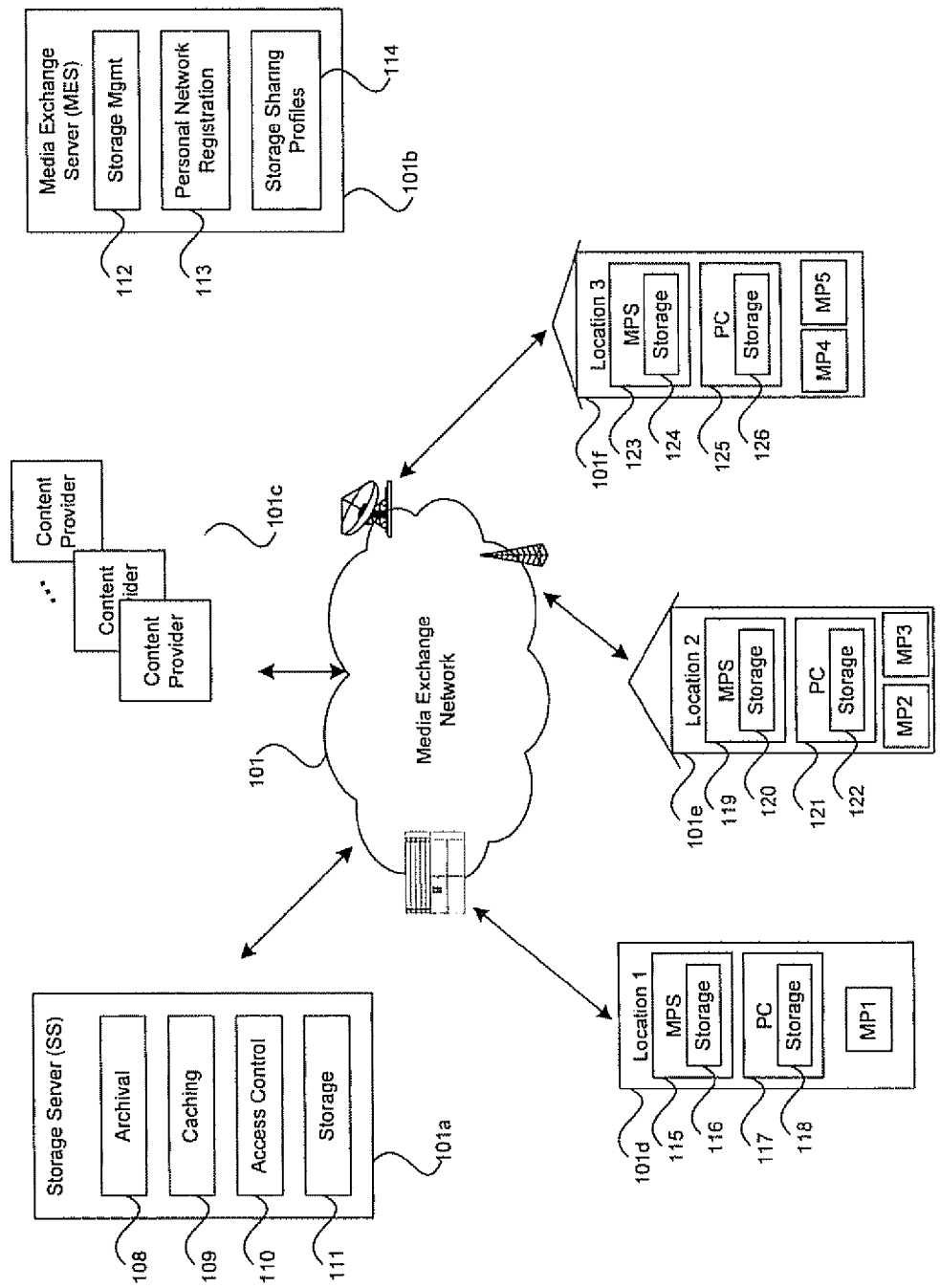
FIG. 1B is a block diagram illustrating a media exchange network (MEN) in accordance with an embodiment of the present invention.

FIG. 1B is a block diagram illustrating a media exchange network (MEN) 101 in accordance with an embodiment of the present invention The media exchange network (MEN) 101 may be representative of the media exchange networks (MENs) 102 and 103. Referring to FIG. 1B, the media exchange network 101 may include a storage server 101a, a plurality of content providers 101c, a media exchange server 101b, a first location 101d, a second location 101e and a third location 101f. The first and second locations 101d, 101e may be a first home and the second location 101f may be any of a home, office or business location, for example. The first location 101d may also include a media peripheral MP1. The second location 101e may also include media peripherals MP2 and MP3. The third location 101f may also include media peripherals MP4 and MP5. Exemplary media peripherals may include but are not limited to cameras, camcorders, PDA, handhelds, laptops, telephones and any combinations thereof. Media peripheral MP1 may be native to location 1. In this regard, the home or original registered location of MP1 is location 1. Likewise, media peripherals MP2 and MP3 may have location 2 as their registered locations, Finally, media peripherals MP4 and MP5 may have location 3 as their registered or native locations The media exchange network 101 may be a communication network, which may include any one or more of an intranet, a cable network, a public switch telephone network (PSTN), a virtual private network (VPN), a satellite communication network or any wired, wireless and/or hybrid network. In this regard, the media exchange network 101 may include any type of network infrastructure, regardless of the access methodology or transport technology Consequently, the communication network 101 may, without limitation, utilize, for example, DSL over coaxial cable, DSL over copper such as twister pair (TP) or unshielded twisted pair (UTP) such as category 5 (CAT 5).

The media storage server or storage server 101a may include an archival block 108, a caching block 109, an access block 110 and a storage block 111. The archival storage block 108 may be used to temporarily archive or permanently archive data. The caching block 109 may include a cache that may be adapted to temporarily store information in order to facilitate reduced data access time and retrieval times. The reduced data access and retrieval times may result in increased data transfer rates and higher throughputs. The access control block 110 may be adapted to control the transfer of information between the storage server 108 and any one or more of the content providers 101c, the media exchange server 101b, the first location 101d, the second location 101e and the third location 101f via the media exchange network 101. The storage block 111 may provide the actual storage devices anud/or interfaces and/or circuitry that may be adapted to store information which may be transferred via the media exchange network 101.

The media storage server (SS) 101a may be configured to interact with the media exchange server (MES) 104 and may provide temporary and/or archival storage for digital media on the media exchange network. For example, the storage server 101a may temporarily store media files that may be addressed to certain MPSs and/or PCs coupled to the media exchange network. These may include MPSs 115, 119, 123 and PCs 117, 121, 125 of the first, second and third locations respectively.

In accordance with various embodiments according to the present invention, an MPS may comprise, for example, at least one of a set-top box (STB), a PC and a television (TV) with a media management system (MMS). An MMS is also known herein as a media exchange software (MES) platform.

An MMS may comprise, for example, a software platform operating on at least one processor to provide certain functionality including, for example, user interface functionality, distributed storage functionality and networking functionality. For example, an MMS may provide control of media peripheral devices, status monitoring of media peripheral devices and inter-home MPS routing selection in accordance with an embodiment of the present invention.

The content providers 101c may include at least one content source. In an embodiment of the present invention, the content providers 101c may include a plurality of content sources supplying voice, video and data media, for example. These content sources may include, but are not limited to, a web portal, merchants, media providers and other data providers. The content resources block 101c may be adapted to provide data to one or more of the first location 101d, second location 101e and third location 101f. The media exchange server 101b may be adapted to facilitate, control and/or coordinate the transfer of information between content sources corresponding to the content providers 101c and the first location 101d, second location 101e and third location 101f. However, some transferring may occur independent of the media exchange server 101b. For example, data may be transferred from the first location 101d to the storage server 101a without interaction from the media exchange server 101b. In certain instances the media exchange server 101b may be informed of the transfer after it has occurred.

The media exchange server 101b may include a storage management block 112, a personal network registration block 113 and a storage sharing profiles block 114. The media exchange server 104 may also provide various services for the media exchange network including device IP address registration, device ID registration, channel/program setup and management, serving as a proxy for anonymity, digital rights management, media caching/storage, and billing/tracking.

The storage management block 112 may include suitable hardware and/or software that may be adapted to manage and provide the services offered by the media exchange server 104. The personal network registration block 113 may also include suitable hardware and/or software that may be configured to provision subscriber service, provide secure data transfer and authenticate subscribers for example. U.S. Provisional Application Ser. No. 60/464,697 filed Apr. 23, 2003, provides a method and system for secure linking with authentication in a media exchange network, and is hereby incorporated herein by reference in its entirety.

The storage sharing profiles block 114 may include suitable hardware and/or memory that may be adapted to store and share subscriber profiles and preferences. The sharing profiles block 114 may be adapted to securely store subscriber information and access to the sharing profiles block 114 may be controlled in a secure manner. Data associated with the sharing profiles block 114 may be encrypted, for example, in order to ensure that the data may not be compromised.

Figure 1C:
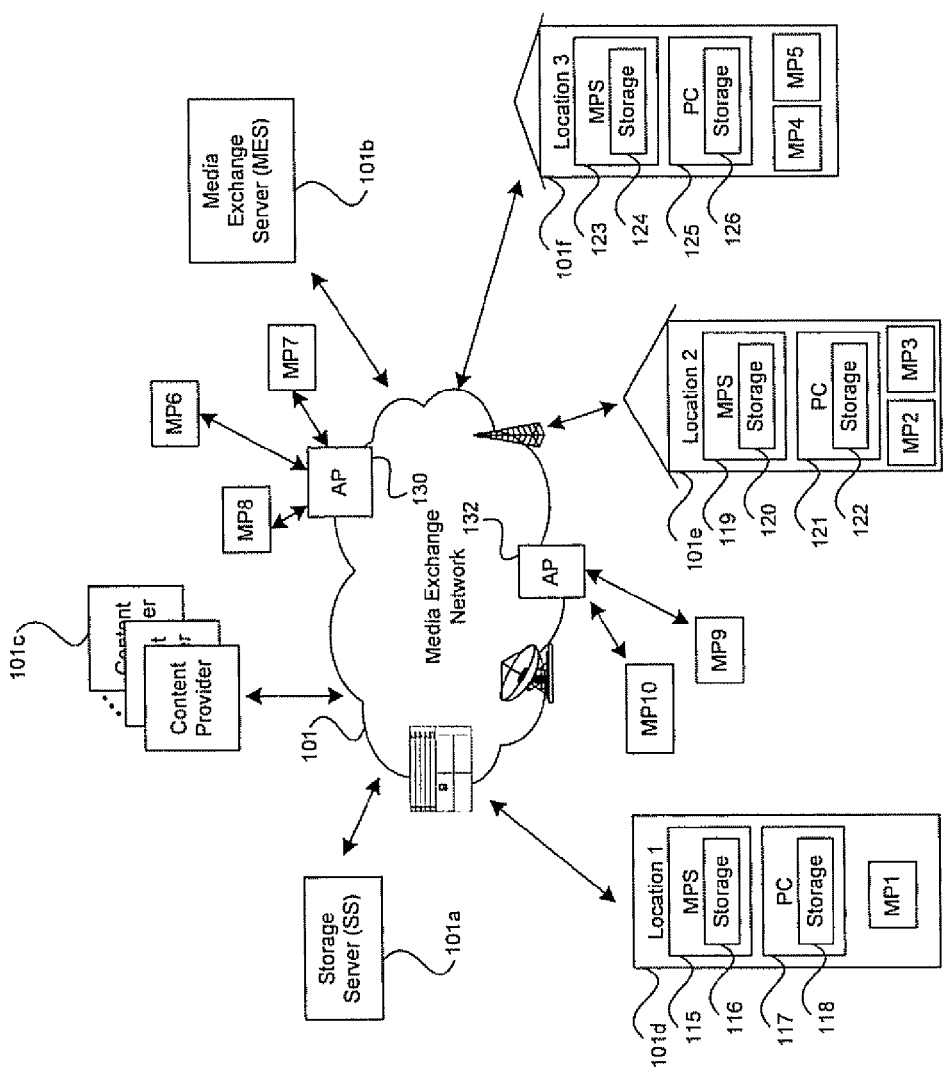
FIG. 1C illustrates the media exchange network of FIG. 1B having access points that may serve as hot spots in accordance with an embodiment of the present invention

In accordance with an embodiment of the present invention, at least one of the media exchange networks 101, 102 and 103 may include at least one hotspot. A hot spot is generally a service location that may contain, for example, wireless fidelity (WI-FI) access points that may provide service to media peripherals that are within a region serviced by the access points FIG. 1C illustrates the media exchange network of FIG. 1B having access points that may serve as hot spots in accordance with an embodiment of the present invention. FIG. 1C is similar to FIG. 1B, except that FIG. 1C has a plurality of additional access points and media peripherals. Referring to FIG. 1D, there are two access points (APs) 130, 132 and media peripherals MP6, MP7, MP8, MP9 and MP10.

In operation, media peripherals MP6, MP7 and MP8 may be serviced by access point 130 and media peripherals MP9 and MP10 may be serviced by access point 132. Although the media peripherals MP6, MP7, MP8, MP9 and MP10 may be native to the media exchange network 101, they may migrate or roam to any of the second media exchange network 102 and the third media exchange network 103. In instances where a media peripheral migrates to a second non-native network, this may be referred to as inter-network roaming. In a case where a media peripheral migrates or roams within a native network, this may be referred to as intra-network roaming. For example, intra-network roaming may occur when a media peripheral previously serviced by access point 130 migrates within a region serviced by access point 132 and is serviced by access point 132. Referring to FIG. 1A, inter-network roaming may occur when a media peripheral previously serviced by the first media exchange network 101 migrates to and is serviced by either the second media exchange network 102 or the third media exchange network 103.

In accordance with an embodiment of the present invention, data may be made available to a media peripheral regardless of whether it performs inter-network roaming or intra-network roaming. Secure authentication and association of the media peripherals may also be provided during both inter-network roaming and intra-network roaming. Referring to FIG. 1A, for example, in a case where a media peripheral native to location 101*d* roams to a second location such as location 103*f* in the third media exchange network, then the media peripheral may have the capability to function as if it were located in media exchange network 101, its native network location. In this regard, information may be transferred by the media peripheral or received by the media peripheral independent of its location within the WAN 100.

In one aspect of the present invention, various roaming parameters may be utilized to control the operation of media peripherals and other network components such as the media processing system during inter-network and intra-network roaming. During media peripheral setup and/or initialization, for example, the roaming parameters may be setup in a roaming profile or configuration file. In this regard, during roaming, the roaming profile may be examined to determine how data for the media peripheral should be handled. For example, a roaming profile for media peripheral MP2 may include data which specifies that during roaming, all downloaded files should be stored in the native MPS. Accordingly, whenever media peripheral MP2 does an intra-network roaming or an inter-network roaming, downloaded information may be routed to storage 120 in MPS 119.

In another aspect of the present invention, a media peripheral profile interface may be established to setup and/or establish roaming parameters for a media peripheral. The media peripheral profile interface may be established at the media processing system level and may define, for example, roaming parameters for native and/or non-native media peripherals The media peripheral profile may also include source address, destination address and an MPS identity that should receive contact information. In this regard, the source address may be utilized during upload and may be utilized to define a media peripheral, media processing system or other system component that should receive an uploaded file, for example. The destination address may define an address of a media peripheral, media processing system or other system component that may be utilized to store downloaded information such as a file. The media peripheral profile may be predefined, modifiable on demand and/or modified upon request. Although the media profile may be stored in a native MPS, the media profile may also be stored within a media peripheral. Accordingly, the stored media peripheral profile may be updated from the MPS and/or the media peripheral.

Roaming information for media peripherals may also be maintained in a media peripheral home location register (MPHLR) and a visitor location register (MPVLR). The media peripheral home location register may include a database that contains semi-permanent information pertaining to all media peripherals in a particular network. The media peripheral visitor location register may include a database that contains information pertaining to only those media peripherals that may be currently serviced by a particular access point or media exchange network. In operation, the MPHLR and the MPVLR may be utilized to determine a location of a media peripheral, whether it may be roaming or whether it may be stationary. Accordingly, after determining a location of a media peripheral based on the MPHLR or the MPVLR, data may be routed or transferred to the media peripheral based on its determined location. For example, if after determining that data should be transferred to a particular media peripheral based on a media peripheral profile entry, no matter where in the WAN 100 the media peripheral migrates, the MPHLR and the MPVLR may be utilized to locate the media peripheral. After the media peripheral is located using the MPHLR and MPVLR, then the data may be transferred to it.

While FIG. 1C illustrates roaming for wireless media peripherals, the present invention is not limited in this regard, and inter-network roaming and intra-network roaming may occur for wired media peripherals. In this regard, a wired media peripheral such as a laptop may be disconnected from its registered or native home location and taken to a new location. When moved to the new location, the media peripheral may function just as it would had it been located at its native home location. For example, a native PC from home location 101*e* in the first media exchange network may be removed and connected to the third location 102*f* in the second media exchange network 102. The third location 102*f* in the second media exchange network 102 may be a hotel, which is utilized by a user of the PC while on vacation, for example. In this regard, whenever the media peripheral or PC is connected to the media exchange network 102, files may be uploaded and stored, for example, according to information stated in the media peripheral's associated media peripheral profile. In a case where a user may be on vacation and would like the pictures downloaded from the user's current location to their parent's home, then the media peripheral profile may contain an entry directing downloads to their parents media peripheral system. For example, in a case where the user's parents reside at the first location 103*d* in the third media exchange network 103, then vacation pictures may be downloaded from the third location 102*f* to the first location 103*d*.

In another aspect of the present invention, information in the media peripheral may be authenticated to ensure that the corresponding media peripheral profile for the media peripheral is always consulted. Particularly, in a public access environment such as the access points of FIG. 1C, authentication may always be performed to ensure the identity of the corresponding media peripheral. In this regard, subsequent to receiving a request to transfer data for a media peripheral, the request may be authenticated using information in the media peripheral profile, for example. The media exchange server 101*b*, the access points 130, 132 and/or the media processing system may be utilized for authentication. Once authentication is complete, information in the media peripheral profile may be utilized to determine how the data transfer should be completed. Accordingly, data transfer may then be achieved based on information in a media peripheral profile. In instances where a determination cannot be made, then a default destination or source may be utilized. For example, the native or registered location for a media peripheral may be utilized as an default media profile destination or source. The native or registered location for a media peripheral may be an MPS. Similarly, in cases where a media peripheral cannot be located or may be inoperable or malfunctioning, then data may be transferred to the default destination or source. Authentication may be accomplished by utilizing, for example, a digital certificate, a serial number, an identification number, an address, a password, a key, and/or any combination thereof.

FIG. 2 is a flow chart illustrating exemplary steps that may be utilized for transferring data in accordance with an embodiment of the present invention. Referring to FIG. 2, the exemplary steps may start with step 202. In step 204, a request to transfer data for a media peripheral may be received. In step 206 the request may be authenticated to ensure that the proper identity of the media peripheral. In step 208, a determination may be made as to whether routing details ale located in a media peripheral profile. In step 208, if there are no routing details in the media peripheral profile, then in step 214, the data may be routed or transferred to a default location or destination. In step 208, if there are routing details, then in step 210, a determination may be made as to whether the media peripheral may be located. In step 210, if the media peripheral is not located, then in step 214, the data may be transferred to the default location. In step 210, if the media peripheral is located, then in step 212, the data may be transferred to the media peripheral based on the routing details in the media peripheral profile. Subsequent to steps 212 and 216, the exemplary steps may end with step 216.

U.S. Provisional Patent Application Ser. No. 60/469,182 filed May 9, 2003, entitled "Method and System for Network Storage in a Media Exchange Network" illustrates exemplary wired and wireless media peripherals and is hereby incorporated herein by reference in its entirety.

A major challenge is to be able to transfer and share many different types of digital media, data, and services between one device/location and another with ease while being able to index, manage, mid store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top boxes or integrated MPS's (media processing systems) may be used with the media exchange network to perform all of the previously described media exchange functions using a remote control with a television screen.

Current set-top boxes may be software enhanced to create an MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
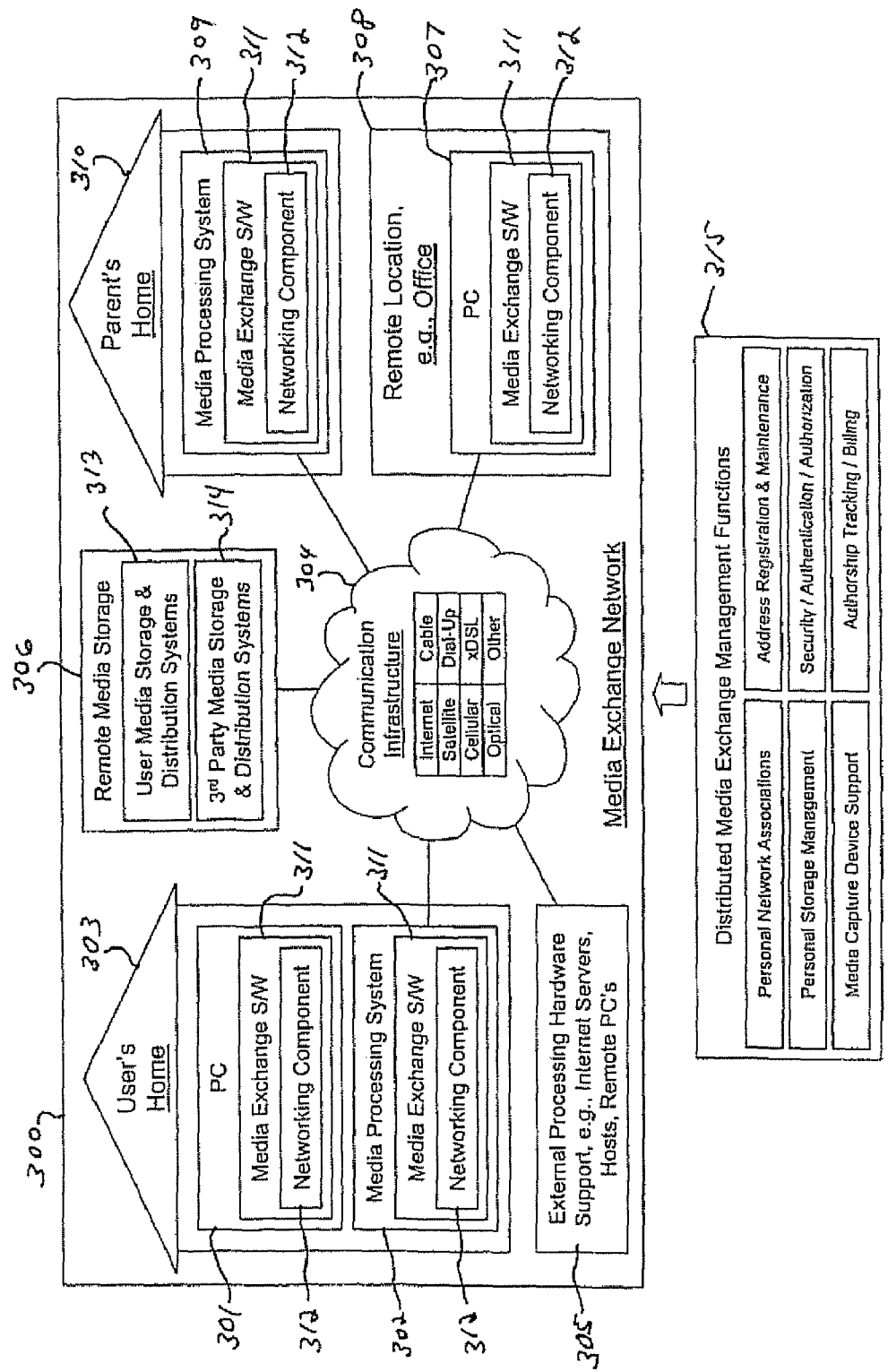
FIG. 3 is a schematic block diagram of a first exemplary media exchange network in accordance with an embodiment of the present invention.

FIG. 3 illustrates a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction-selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized Internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of Internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300, For example, the personal network associations and personal storage management functions may be integrated in the PC 301 at the user's home 303.

Figure 4:
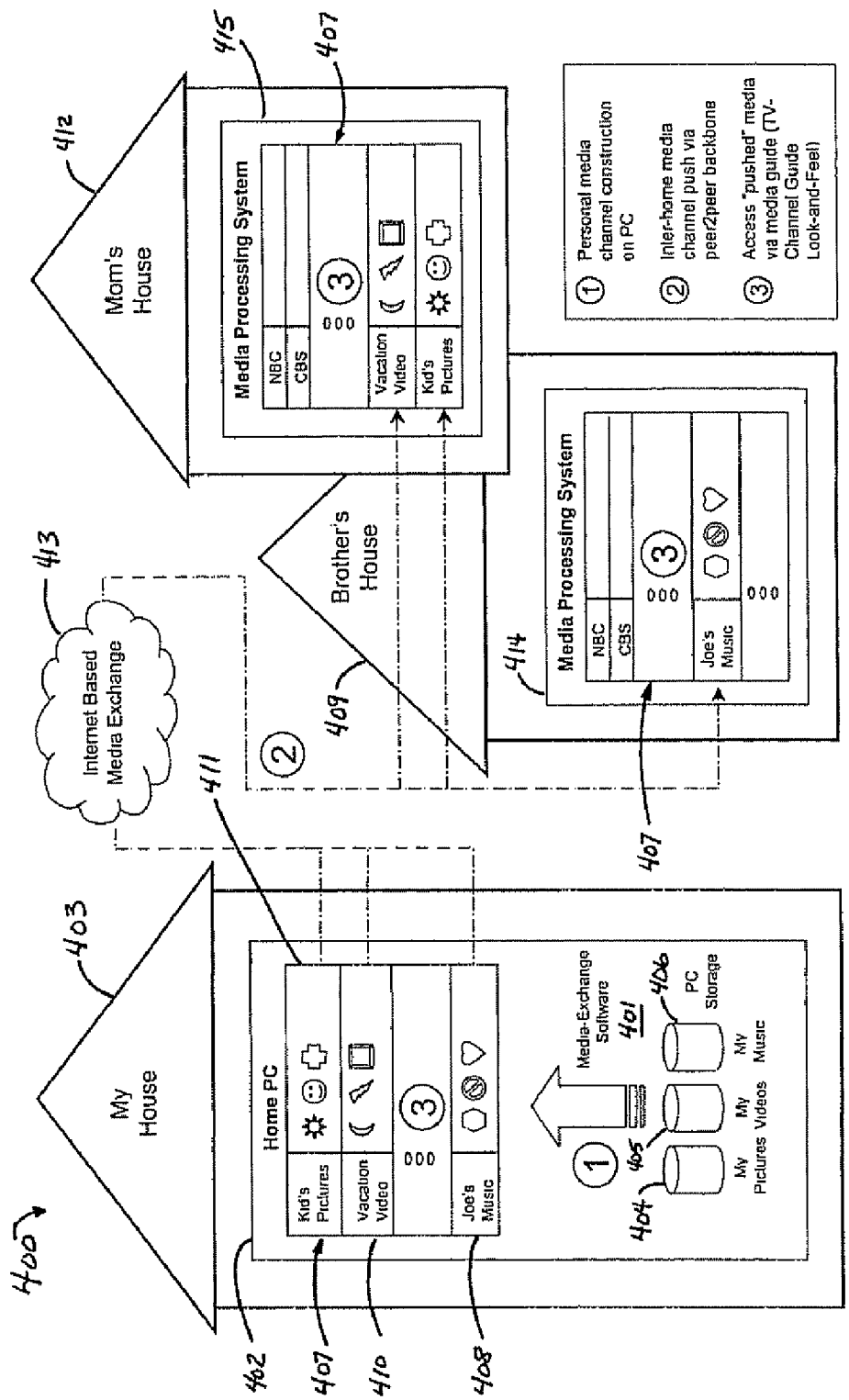
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (ego, "Joe's Music") to "brother's house" 409 and pushes two media channels 410 and 411 (e.g., "Vacation Video" and "Kid's Pictures") to "Mom's house" 412 via a peer-to-peer server 413 over the Internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
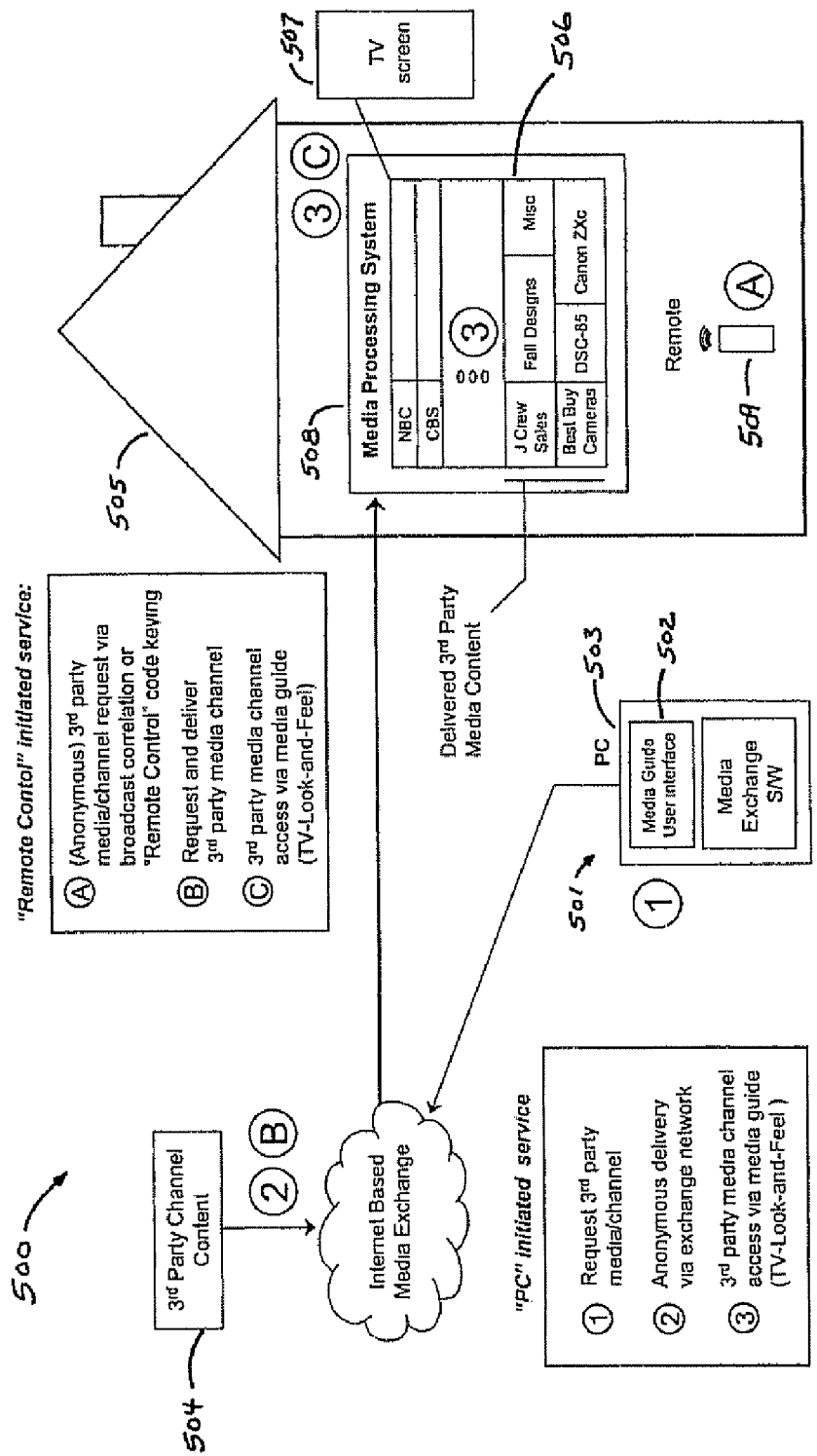
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an Internet-based media exchange network 500 using a media guide user interface 502 on a PC 503. In step 2, an anonymous delivery of tie requested third-party channel 504 is made to a second party 505 via the Internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an Internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the Internet-based media exchange network 500. In step C, the first party 501 accesses the third-party channel 504 using a media guide user interface 502 on a PC 503.

Figure 6:
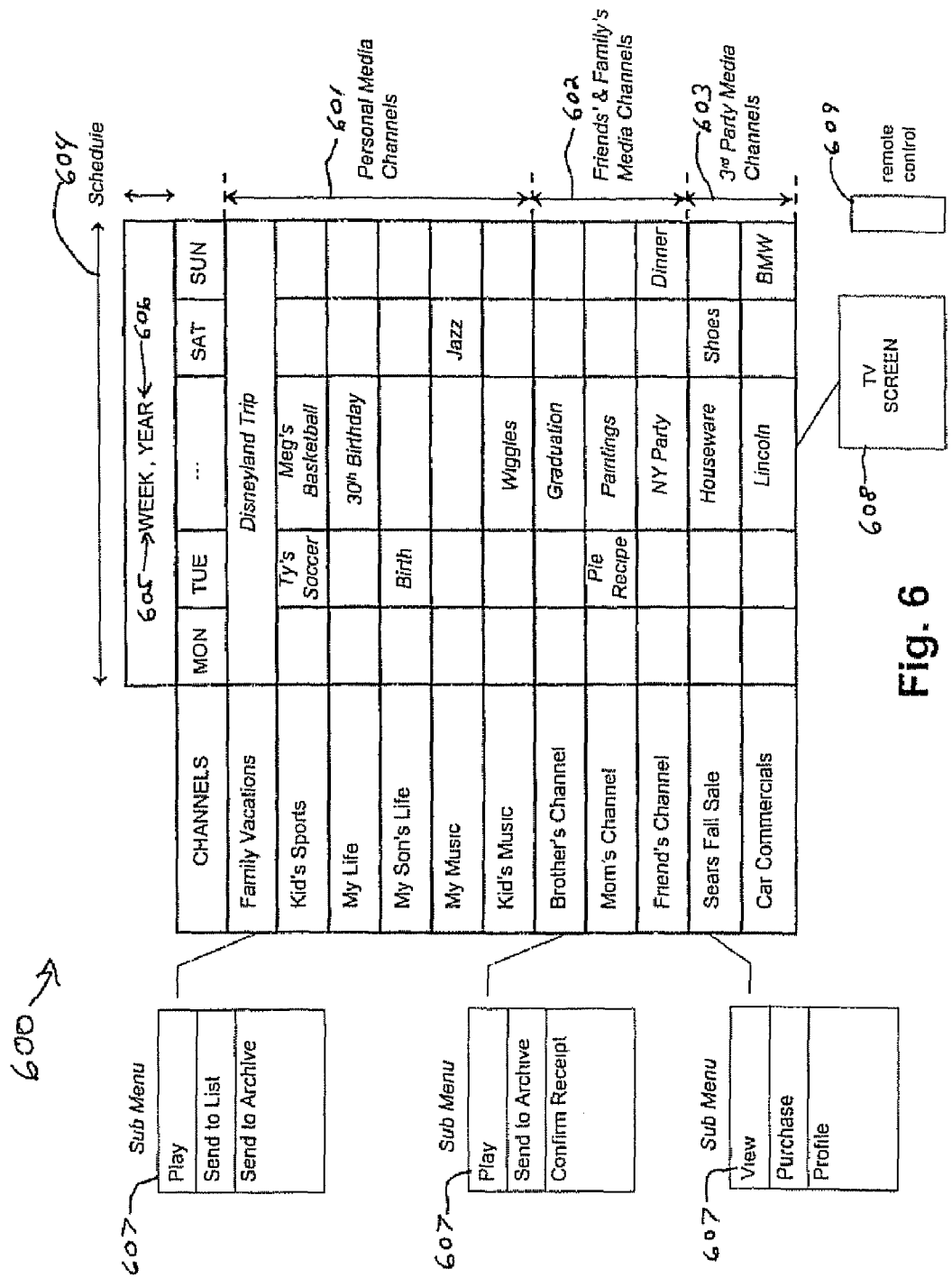
FIG. 6 is an exemplary illustration of a media guide user interface in accordance with an embodiment of the present invention.

FIG. 6 illustrates a media guide user interface 600 in accordance with an embodiment of the present invention. The media guide user interface 600 may be displayed oil a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "Send's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
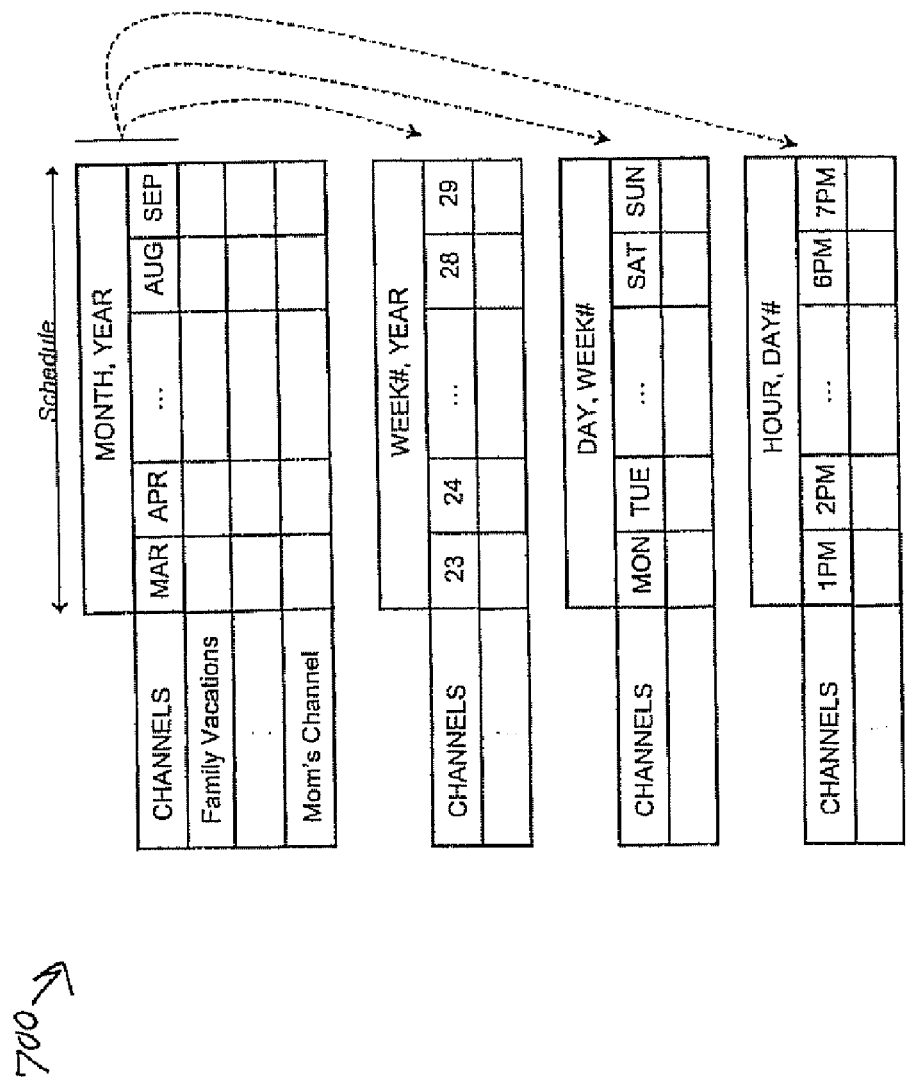
FIG. 7 is an exemplary illustration of several instantiations of a media guide user interface of FIG. 4 in accordance with an embodiment of the present invention

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the fiend in 18 minutes using queuing and cost $1.20, for example, The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
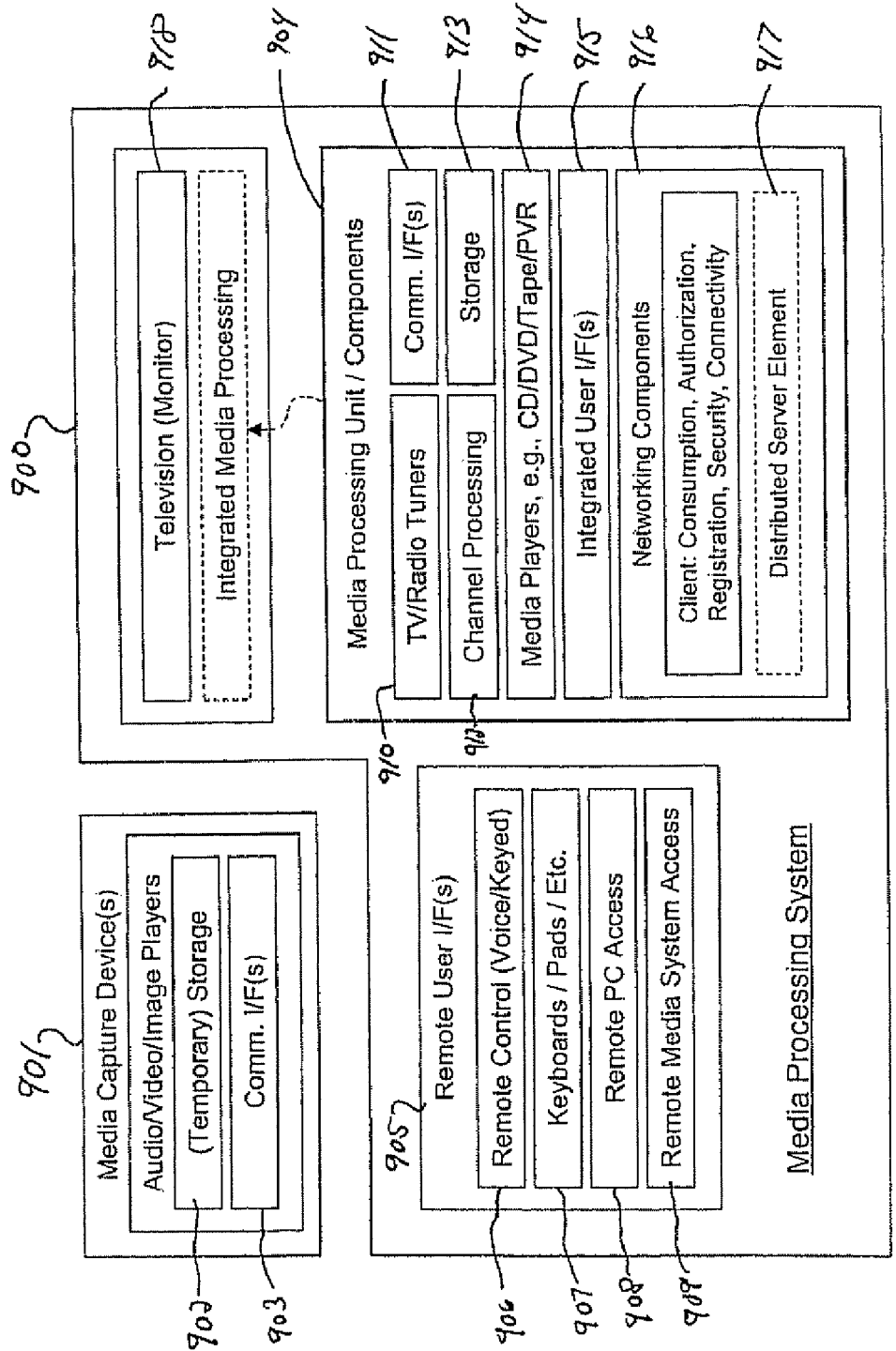
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
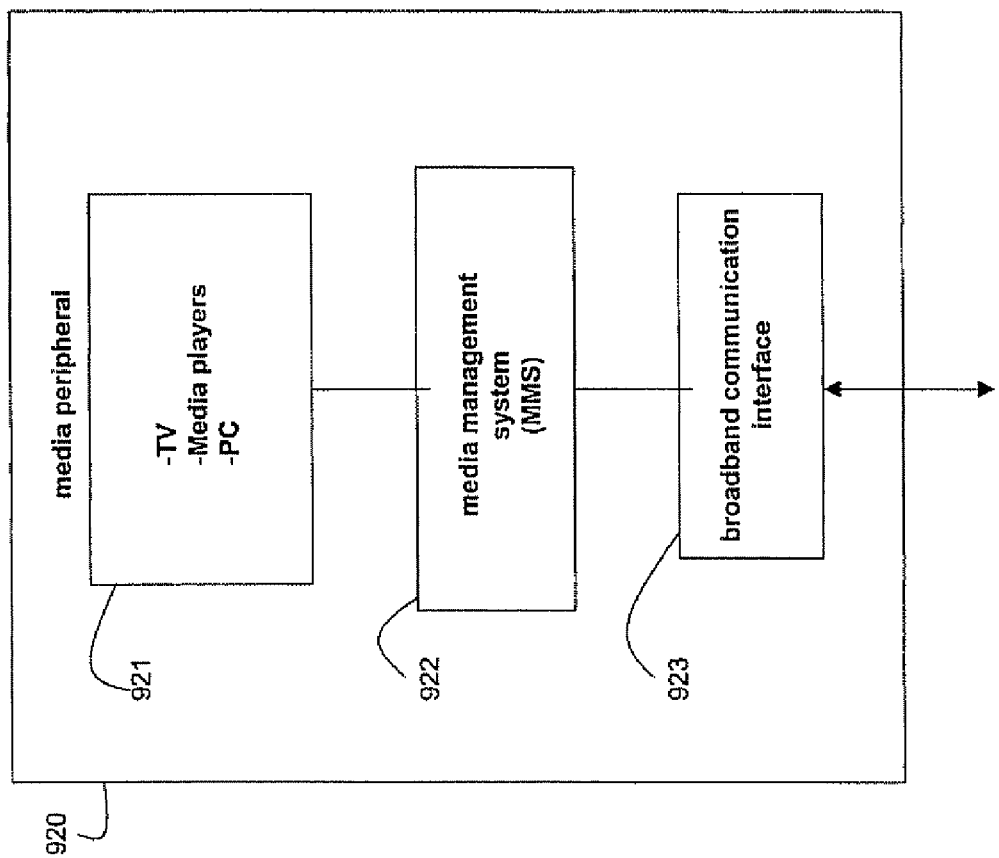
FIG. 9B illustrates an alternative embodiment of a media processing system (MPS) in accordance with various aspects of the present invention

FIG. 9B illustrates an alternative embodiment of a media processing system (MPS) 920 in accordance with various aspects of the present invention. The MPS 920 is essentially an enhanced set-top box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and an MP3 player) for video, image, and audio consumption of broadcast and/or personal channels. The broadband communication interface 923 may include internal modems (e g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
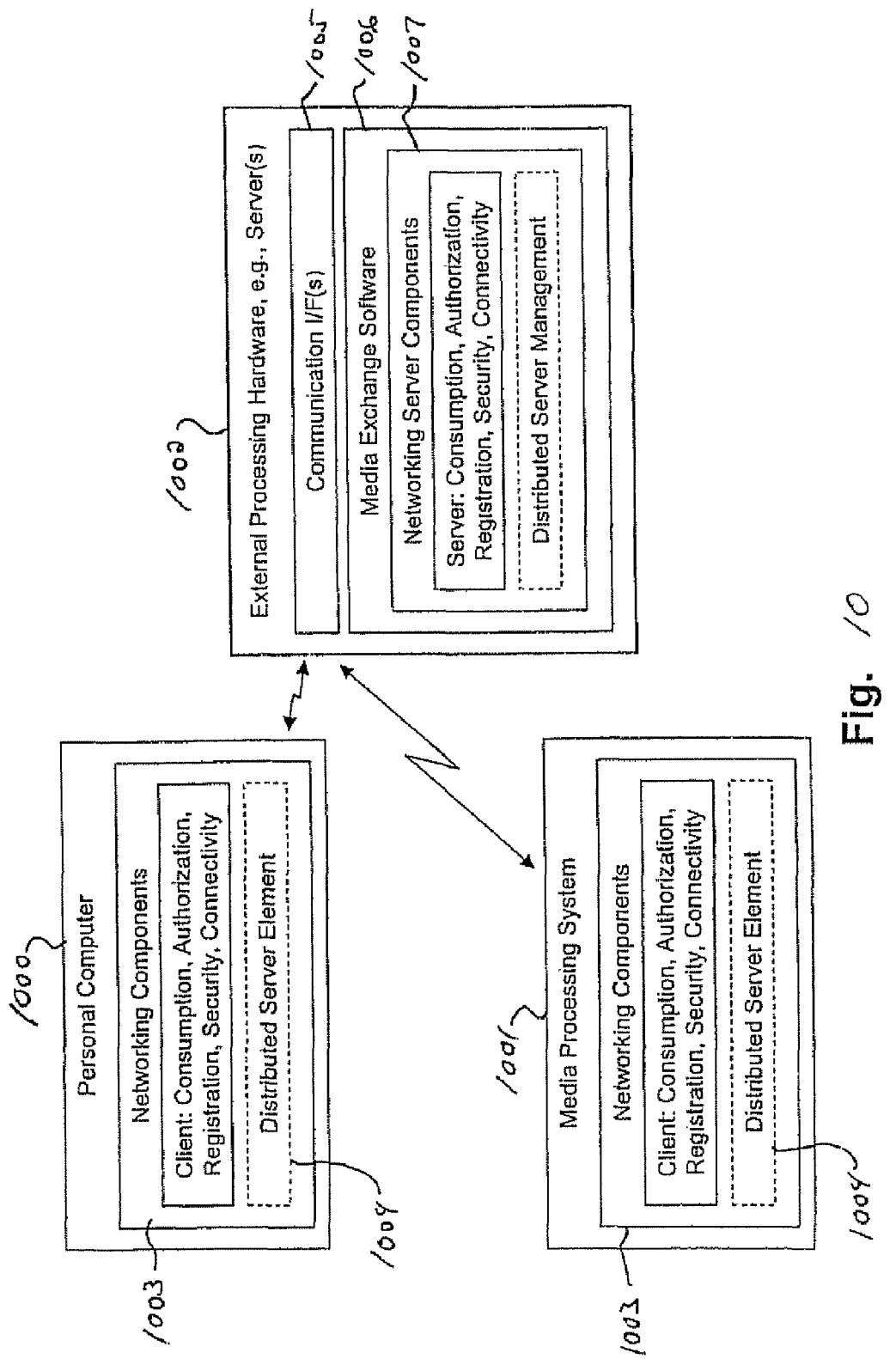
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g.., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
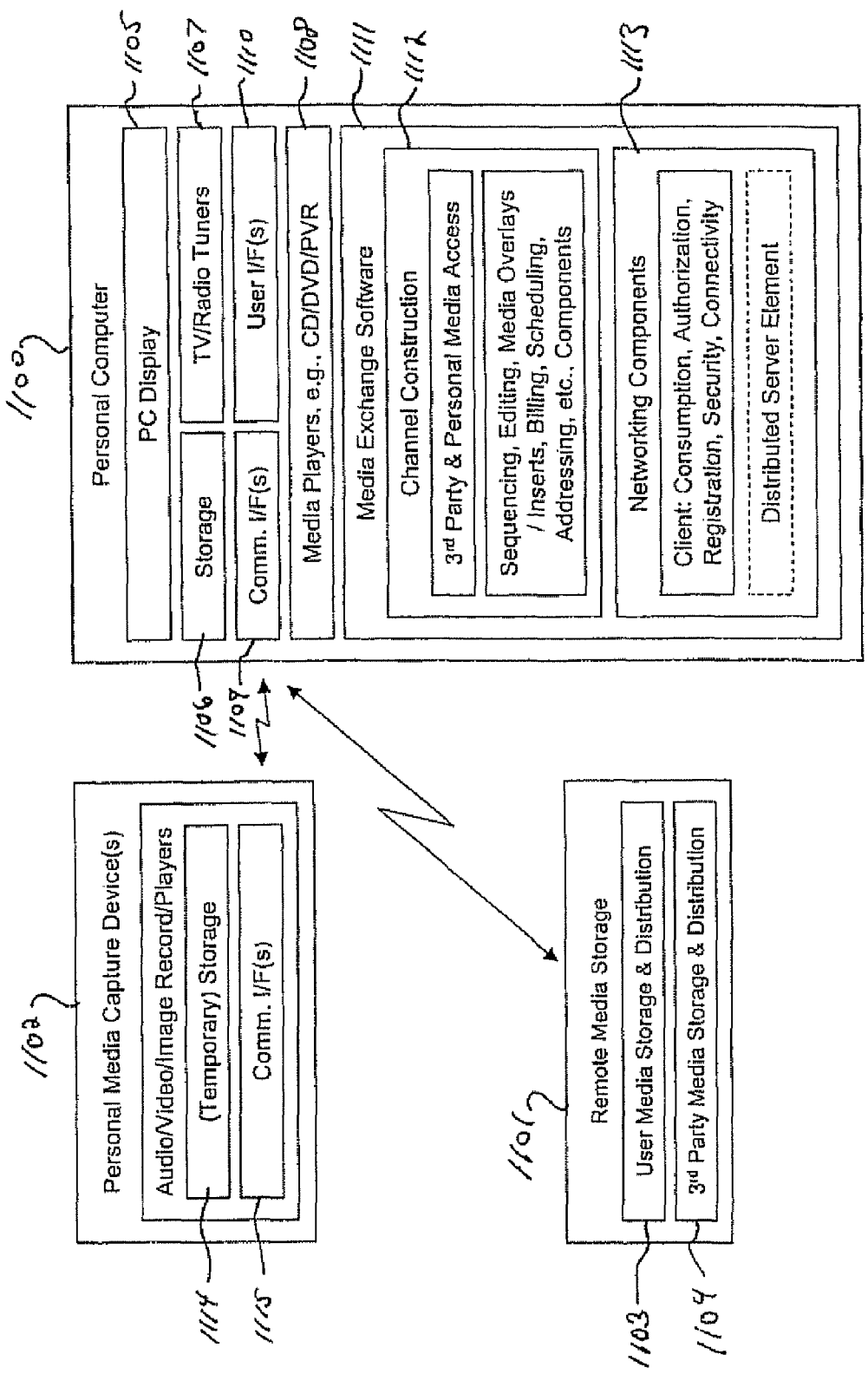
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

In summary, some embodiments according to the present invention may relate to systems and methods that provide a media exchange network to support remote peripheral access.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for providing remote access, comprising:
receiving a request by a media management system associated with a native network to transfer information to or from a media device, wherein the media device is communicatively coupled to a non-native network;
authenticating the request by the media management system; and
routing the information based on a profile of the media device, the profile being stored in at least one of: the media management system and the media device, wherein the profile comprises one or more roaming parameters for routing the information when the media device is communicatively coupled to the non-native network.

2. The method according to claim 1, wherein routing the information comprises routing the information based on routing details of the profile of the media device.

3. The method according to claim 1, wherein routing the information comprises routing the information to a default location when no routing details are in the profile of the media device, wherein the default location includes the media management system.

4. The method according to claim 1, wherein routing the information comprises routing the information to a default location when the media device cannot be located, wherein the default location includes the media management system.

5. The method according to claim 1, comprising determining a location of the media device by accessing information stored in a media peripheral home location register and a media peripheral visitor location register.

6. A system operable to provide remote access, comprising:
- a media device operable to roam in a non-native network by communicatively coupling to the non-native network, wherein the media device is operable to generate a request to a communication device communicatively coupled to a native network to transfer information to or from the media device; and
- a storage operable to store a profile of the media device, wherein the storage is in the media device, the profile comprising roaming parameters for routing of the requested information to or from the media device after the generated request is authenticated.

7. The system according to claim 6, wherein the generated request is authenticated by the communication device communicatively coupled to the native network prior to the transferring of the information to or from the media device.

8. The system according to claim 6, wherein routing the requested information comprises routing the information based on routing details of the profile of the media device.

9. The system according to claim 6, wherein routing the requested information comprises routing the information to a default location if no routing details are in the profile of the media device.

10. The system according to claim 6, wherein routing the requested information comprises routing the requested information to a default location if the media device cannot be located.

11. The system according to claim 6, wherein the communication device communicatively coupled to the native network determines a location of the media device.

12. A media management system operable to communicatively couple with a native network, comprising:
- a storage operable to store a profile of a media peripheral;
- at least one processor operable to:
  - receive a request for a data file associated with the media peripheral;
  - determine a location of the media peripheral;
  - access the profile of the media peripheral, wherein the profile includes one or more roaming parameters for routing data files associated with the media peripheral; and
  - when the location of the media peripheral is determined as in a non-native network, route the data file to a destination device identified by the roaming parameters in the profile of the media peripheral.

13. The media management system of claim 12, wherein the destination device includes at least one of: the media peripheral; the media management system in the native network; and a media processing system associated with another media peripheral.

14. The media management system of claim 13, wherein the at least one processor is further operable to:
- when the location of the media peripheral is not determined, route the data file to a default device identified in the profile of the media peripheral, wherein the default device is the media management system in the native network.

15. The media management system of claim 13, wherein the at least one processor is further operable to:
- when the destination device is not identified by the roaming parameters in the profile of the media peripheral, route the data file to a default device identified in the profile of the media peripheral, wherein the default device is the media management system in the native network.

16. The media management system of claim 12, wherein the at least one processor is operable to determine the location of the media peripheral by:
- accessing information stored in a media peripheral home location register and a media peripheral visitor location register.

17. The media management system of claim 16, wherein the media peripheral home location register stores information for a plurality of media peripherals associated with the native network and wherein the media peripheral visitor location register stores information for a plurality of media peripherals currently serviced in the native network.

18. The media management system of claim 12, wherein the profile of the media peripheral is further stored in the media peripheral.

19. The media management system of claim 12, wherein the media management system includes at least one of: a media exchange server, a media processing system and a personal computer.

20. The media management system of claim 12, wherein the at least one processor is further operable to:
- authenticate the media peripheral in response to the request.

* * * * *